US008753512B1

(12) United States Patent
Slajchert

(10) Patent No.: US 8,753,512 B1
(45) Date of Patent: Jun. 17, 2014

(54) BIOLOGICAL AND CHEMICAL DENITRIFICATION METHOD AND SYSTEM FOR REMOVING NITRATES FROM WATER

(71) Applicant: George Slajchert, San Mateo, CA (US)

(72) Inventor: George Slajchert, San Mateo, CA (US)

( * ) Notice: Subject to any disclaimer, the term of this patent is extended or adjusted under 35 U.S.C. 154(b) by 0 days.

(21) Appl. No.: 13/797,945

(22) Filed: Mar. 12, 2013

(51) Int. Cl.
*C02F 3/00* (2006.01)
(52) U.S. Cl.
USPC ........... 210/610; 210/617; 210/739; 210/196; 210/291; 210/903
(58) Field of Classification Search
USPC .......... 210/617, 610, 739, 194, 196, 291, 903
See application file for complete search history.

(56) References Cited

U.S. PATENT DOCUMENTS

| | | | | | |
|---|---|---|---|---|---|
| 2,992,986 | A | * | 7/1961 | Ingram | 210/612 |
| 3,773,660 | A | * | 11/1973 | Hopwood | 210/617 |
| 4,925,552 | A | * | 5/1990 | Bateson et al. | 210/150 |
| 5,800,709 | A | * | 9/1998 | Smith | 210/617 |
| 6,616,843 | B1 | * | 9/2003 | Behmann et al. | 210/605 |
| 7,022,233 | B2 | * | 4/2006 | Chen | 210/605 |
| 2003/0201225 | A1 | * | 10/2003 | Josse et al. | 210/605 |

* cited by examiner

*Primary Examiner* — Chester Barry
(74) *Attorney, Agent, or Firm* — Nixon Peabody LLP

(57) ABSTRACT

An anoxic packed-bed biological and chemical system for removing nitrates/perchlorate from water includes a vessel having a distribution plate that partitions the vessel into a lower influent-receiving chamber and an upper biological and chemical denitrification chamber. A granular media is supported by the distribution plate to provide a packed bed that has sites for biological growth. A recycle system recycles partially treated water into the closed lower end of the vessel for upflow through the distribution plate.

27 Claims, 1 Drawing Sheet

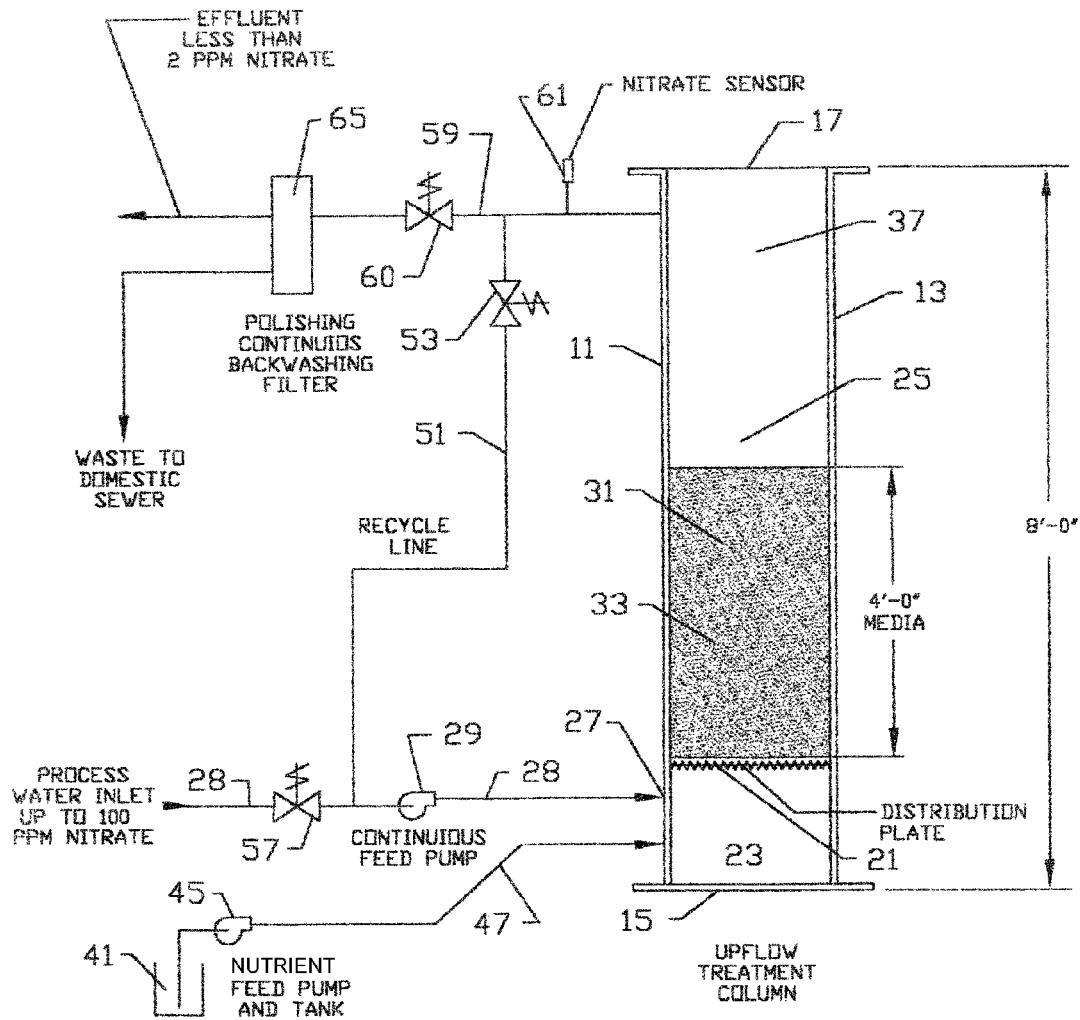

BIOLOGICAL AND CHEMICAL DENITRIFICATION METHOD AND SYSTEM FOR REMOVING NITRATES FROM WATER

FIELD OF THE INVENTION

The present invention relates to biological and chemical denitrification reactors and methods for removing nitrates from water.

BACKGROUND

Groundwater is an important source for drinking water. In the United States in 1990, groundwater provided about 40% percent of water withdrawn for public supply for cities and towns and about 95% percent of water withdrawn by self-supplied systems for domestic use. Nitrates are common chemicals that can pass through soil and potentially contaminate groundwater. Nitrates originate from nitrogen ($N_2$), a plant nutrient supplied by inorganic fertilizer and animal manure. Additionally, airborne nitrogen compounds given off by industry and automobiles can precipitate onto land in rain or as dry particles. Other non-agricultural sources of nitrate include lawn fertilizers, septic systems, and domestic animals.

In agricultural areas, nitrate is the primary form of nitrogen. Nitrate is water-soluble and can easily pass through soil to the groundwater table. The nitrate concentration in groundwater can reach high levels as more nitrogen fertilizer is applied to the land surface annually or more frequently. Nitrate can persist in groundwater for decades. By some estimates, only about one-half of the nitrogen-containing fertilizers applied to agricultural crops is taken up by the crops, and the other half is left in the soil.

Although nitrate generally is not an adult public-health threat, ingestion in drinking water by infants can cause fatally low oxygen levels in the infant's blood, a condition known as methemoglobinemia. Nitrate concentrations in natural ground waters are usually less than 2 mg/L.

In California, nitrate groundwater contamination threatens the drinking water supplies of more than 1.3 million people living in or near agricultural areas. For example, in one sample of 2,500 drinking water wells in agricultural areas, the nitrate concentration exceeded the MCL (Maximum Contaminant Level) in 10% of the wells.

Nitrogen chemistry is complex because nitrogen can have several oxidation states. Moreover, the oxidation states created by bacterial action can be either positive or negative, depending upon whether the bacteria exist in aerobic or anaerobic conditions. The nitrogen cycle illustrates the formation of nitrite ions ($NO_2^-$) and nitrate ions ($NO_3^-$). Nitrites can be oxidized by Nitrobacter bacteria to form nitrates. Under anoxic conditions, nitrites and nitrates are both reduced by a process call denitrification. During denitrification, some bacteria produce ammonia while others create nitrogen gas. For denitrification to occur, organic material must be present, as it is oxidized for energy while the nitrogen is being reduced.

Like nitrates, water pollution by perchlorate can be a problem. Perchlorate is both a naturally occurring and man-made chemical that is used to produce rocket fuel, fireworks, flares and explosives. Perchlorate can also be present in bleach and in some fertilizers. Some scientific research has indicated that perchlorate contamination of water can disrupt the thyroid's ability to produce hormones needed for normal growth and development. Some suggestions have been made that the safe level of concentration of perchlorate in potable water is less than 10 PPB.

BRIEF DESCRIPTION OF THE DRAWINGS

The accompanying drawings, which is incorporated into and constitute a part of this specification, illustrates one exemplary embodiment and, together with the description of this exemplary embodiment, serves to explain the principles and implementations of the invention.

In the Drawings:

FIG. 1 is a diagram illustrating an anoxic packed-bed biological and chemical denitrification reactor and method for removing nitrates from influent water in accordance with an exemplary embodiment.

DESCRIPTION OF EXAMPLE EMBODIMENTS

FIG. 1 shows an anoxic packed-bed biological and chemical denitrification reactor 11 for removing nitrates from influent water. In the illustrated embodiment, the anoxic packed-bed biological and chemical denitrification reactor 11 includes a denitrification vessel 13 having a closed lower end 15 and a vented upper end 17. Preferably, the denitrification vessel 13 is cylindrical, but it may have other shapes. In one pilot plant, a cylindrical denitrification vessel 13 is about 8 feet high and 2.25 feet in diameter, but its dimensions are design choices. In the present context, the term "removing nitrates" can be understood to include destroying nitrates by chemical converting $NO_3$ to nitrogen gas $N_2$+oxygen gas $O_2$.

As further illustrated in FIG. 1, a distribution plate 21 is mounted in the denitrification vessel 13 to partition the vessel into a lower influent-receiving chamber 23 and an upper biological and chemical denitrification chamber designated by the number 25. The distribution plate 21 will be described in more detail below, but for present purposes, it should be understood that the distribution plate 21 has openings therein to allow the up-flow of water through the plate. As implied by its name, the openings are formed in a pattern that allows the constant up-flow of water across the horizontal extent of the distribution plate 21 and, hence, horizontally across the interior of the denitrification chamber 25. In one pilot plant, the distribution plate 21 was fixedly mounted in the cylindrical denitrification vessel 13 at about 20% of the elevation of the vessel 13. Thus, the influent-receiving chamber 23 represented about 20% of the volume of the vessel 13.

As also illustrated in FIG. 1, there is at least one aperture 27 formed in the lower influent-receiving chamber 23 for receiving influent or "process" water from a source conduit 28. In normal operation, the influent water contains nitrates with concentrations up to 100 ppm. In one pilot plant, the influent water contained nitrates in a concentration of up to 100 ppm and the maximum flow rate through the reactor was about 150 gal/d/ft² of reactor. In operation of the anoxic packed-bed biological and chemical denitrification reactor, the influent water flows upwardly through the openings that are formed through and across the horizontal extent of the distribution plate 21.

In the illustrated embodiment, the flow into the influent-receiving chamber 23, and hence the upward flow through the vessel 13, is accomplished by a feed pump 29 which, in the preferred embodiment, is a continuous feed pump. In the embodiment illustrated, the feed pump 29 is in-line with the conduit 28 which is received by the aperture 27 in the influent-receiving chamber 23. In the pilot plant, the flow rate from the feed pump was sufficient to maintain an upflow rate of about 200 gal/d/ft$^2$.

As still further shown in FIG. 1, a packed bed 31 of granular media 33 is supported by the distribution plate 21. The purpose of the granular media 33 in the packed bed 31 is to provide sites for biological growth. It should be understood that the term "packed bed" is used to distinguish the bed 31 from a fluidized, or moving, bed reactor. It should be understood, however, that there can be some active movement of the granular media 33 in the packed bed 31 when the anoxic packed-bed biological and chemical denitrification reactor 11 is in operation due to the upflow of water in the vessel 13. In fact, movement in the packed bed 31 provides advantages as will be discussed herein below.

In one pilot plant, the packed bed 31 of granular media was about 48" in height and, thus, occupied about 50% of the volume of the denitrification vessel 13. Also in the pilot plant, the distribution plate, referred to as a punched plate, was 3/16"-1/4" thick. The influent would be pumped into the vessel under pressure and flowed up thru the punched plate. The slots in the punched plate were 0.25 mm, but could be larger slot opening ranging from 0.40-0.45 mm. The media could be anthracite, sand or Macrolite. It could be layered—coarse 12", finer 12", finest 24"-48", so that the total depth was 4' to 6' total. The punched plate was a stainless, high strength alloy.

Referring again to the drawing of the reactor vessel system 13 in FIG. 1, a media-free volume 37 remains above the packed bed 31 and occupies about 30% of the volume of the denitrification vessel 13. The purpose of the media-free volume 37 is to accommodate expansion of the packed bed due to up-flow and to contain a quantity of at least partially de-nitrified water that has passed through the packed bed 31 prior to discharge from the reactor 11.

In the pilot plant, the granular media 33 was packed anthracite particles whose diameters varied generally from about 1 to 2 mm. Further the bed was seeded with native soil bacteria, which seeded the growth of biological substances on the granular media. In a corresponding laboratory study, filtration flow rates from 1.40 to 5.24 m/d (35 to 130 gal/d/ft$^2$) were employed.

In the packed bed 31 of granular media 33, both chemical and biological reaction occur that, together, accomplish removal of nitrates from the up-flowing water. The biological reaction that occurs in the packed bed 31 of granular media 33 is hosted and facilitated by the bacteria in the soil that is introduced into the bed. The biological reaction that occurs is in anoxic or anaerobic conditions. In the packed bed, some bacteria attach to the granular media 33 and others are suspended in interstices in the packed bed 31.

Additionally as show in FIG. 1, the reactor system includes a nutrient feed source 41 and a nutrient feed pump 45 connected in a conduit 47 to transport nutrients into the lower influent-receiving chamber 23 of the reactor 11. The purpose of the nutrients is to facilitate the growth of biological substances on the granular media 33. More specifically, the nutrients feed and encourage the growth of native soil bacteria which has been seeded into the packed bed 31 of granular media 33. In practice, the nutrient can be methyl alcohol.

Still further shown in FIG. 1, the system of the anoxic packed-bed biological and chemical denitrification reactor 11 includes a recycle conduit 51 for recycling at least a selected portion of partially de-nitrified water from the media-free volume 37 into the influent-receiving chamber 23 at the closed lower end of the vessel 13. In the embodiment illustrated, a control valve 53 is located in the conduit 51 for controlling the volumetric recycle flow. Also in the embodiment illustrated, the recycle conduit 51 is connected ahead of the feed pump 29, but other connections could be made to recycle the water from the media-free volume 37 into the influent-receiving chamber 23.

Also in the embodiment illustrated, the process water from a source conduit 28 is also fed to the feed pump 29 via a control valve 57. Thus, in the illustrated embodiment, wherein the recycle conduit is connected at (or before) the inlet to the pump 57, at least a selected portion of the at least partially de-nitrified water is mixed with the influent water for pumping into the lower chamber 23.

The portion of the water from the media-free volume 37 which is not recycled is discharged from the anoxic packed-bed biological and chemical denitrification reactor 11. In the embodiment illustrated, the non-recycled effluent water is discharged through a conduit 59 connected to the recycle conduit 51, but other plumbing could be provided. The embodiment illustrated further includes a control valve 60. In some modes of operation, as will be described below, this third control valve 60 is redundant to the recycle control valve 53. Nevertheless, the operation of the two valves can be coordinated and, at the very least, the presence of both valves is a safety feature and valve 60 can prevent the unwanted discharge of nitrate-containing water from anoxic packed-bed biological and chemical denitrification reactor.

An important aspect of the present invention relates to the control of the amount of flow through recycle conduit 51. In the preferred embodiment, the recycle quantity is based upon outputs from a sensor 61 for monitoring the nitrate content of effluent from the media-free volume 37. That is to say, the sensor 61 monitors the nitrate content of the effluent from the upper biological and chemical denitrification chamber 25. In practice, the nitrate sensor should have sufficient accuracy to monitor nitrate concentrations at least as low as those mandated by federal, state or local laws. As mentioned above, the U.S. Environmental Protection Agency (EPA) has established a drinking-water standard of 10 milligrams per liter nitrate as nitrogen (or 10 ppm nitrate).

In the operation of the above-mentioned pilot plant, the final effluent had less than 2 ppm nitrate after passing through a polishing continuous backwashing filter 65.

In operation of the anoxic packed-bed biological and chemical denitrification reactor of the present invention, the nitrate concentration in the final effluent is controlled by adjusting the recycle proportion. In the illustrated embodiment, the recycle is controlled by the valve 53 which adjustably restricts the quantity of flow of the at least partially de-nitrified water through the recycle conduit 51 for reentry into the chamber 23 of the denitrification reactor 11. Although various control algorithms can be used, the basic feedback concept is that the recycle quantity is increased, as a percentage of the effluent from media-free volume 37 as the nitrate concentration in that effluent increases beyond desired levels. The maximum recycle, of course, would be 100% and, in that event, the valve 57 would be closed so that there would be no process water admitted from the source conduit 28. In the pilot plant, the recycle flow varied from about 0 to about 25% of the total volume of water pumped in chamber 23.

In practice, the anoxic packed-bed biological and chemical denitrification reactor is operated with coordination between the valves 53, 57, and 60 as well as the nitrate sensor 61 to maintain anoxic conditions within the packed bed 31 for removing nitrates from the influent water. The operation could be by digital or analog automated control, or by hand.

At this juncture, it can be appreciated that the above-described system including the anoxic packed-bed biological and chemical denitrification reactor 11 provides, in a sense, a dual denitrification process, since the process uses both suspended and attached biomass growth for removing nitrates from nitrate-rich influent water. This dual denitrification process allows reduced contact time high nitrate-to-nitrite destruction, typically <3/1 ppm $NO_3/NO_2$.

Also at this juncture, workers skilled in this art can appreciate that the above-described system, including the anoxic packed-bed biological and chemical denitrification reactor 11, can be used to remove perchlorates from water. This benefit follows from the fact that perchlorate cannot be removed effectively in the presence of nitrate.

Various benefits of the above-discussed packed-bed biological and chemical denitrification reactor can now be understood. For instance, the up-flow design allows the use of a single reactor, permits continuous operation (e.g., 24 hours per day, for 7 to 10 days) without backwashing protocol. The backwashing cycle is dependent on water quality, and the final polishing filter is mandated, typically, by State Departments of Health. As another example, the up-flow design allows a beneficial two-stage contact time (CT). The first CT is in the "attached growth" biomass media that is based on the 48" anthracite media depth. The second CT is in the "suspended biomass" contact period due to the up-flow of water through the packed bed. In essence, this doubles the critical contact time that is necessary for the high nitrate destruction. In practice, this sequence produces a very high quality effluent with less than 2.0 NTU and, in tests, near or less than 1.0 NTU for 80% to 90% of the time of operation of the anoxic packed-bed biological and chemical denitrification reactor. Thus, the anoxic packed-bed biological and chemical denitrification reactor system removed sufficient nitrates from nitrate-rich influent water to provide potable water.

What is claimed is:

1. An anoxic packed-bed biological and chemical denitrification reactor system for removing nitrates from nitrate-rich influent water comprising:
   a) a denitrification vessel having a closed lower end and a vented upper end;
   b) at least one distribution plate mounted in the vessel to partition the vessel into a lower influent-receiving chamber and an upper biological and chemical denitrification chamber, the distribution plate having openings formed therein to allow the upflow of water through the plate;
   c) at least one aperture in the lower influent-receiving chamber for receiving influent water containing nitrates;
   d) granular media supported by the distribution plate in sufficient quantity to provide a packed bed that has sites for biological growth while leaving a media-free volume above the media to contain a quantity of at least partially de-nitrified water;
   e) means to provide nutrients into the lower influent-receiving chamber to facilitate the growth of biological substances on the granular media;
   f) a recycle conduit to recycle at least a selected portion of the at least partially de-nitrified water into the closed lower end of the vessel;
   g) a nitrate sensor to sense the nitrate content of the effluent from the upper biological and chemical denitrification chamber; and
   h) a recycle valve for controlling the quantity of flow of the at least partially de-nitrified water through the recycle conduit for reentry into the closed lower end of the denitrification vessel, whereby the nitrate sensor and the valve means operated in a cooperative manner to maintain anoxic conditions within the packed bed during up-flow of influent water for removing nitrates from influent and recycled water.

2. An anoxic packed-bed biological and chemical denitrification reactor system for removing nitrates from influent water according to claim 1 wherein openings are formed in a pattern that allows the generally constant up-flow of water across the horizontal extent of the distribution plate and, hence, horizontally across the interior of the denitrification vessel.

3. An anoxic packed-bed biological and chemical denitrification reactor system for removing nitrates from influent water according to claim 1 wherein pump means connect to the at least one aperture in the lower influent-receiving chamber for pumping influent water containing nitrates into the lower chamber.

4. An anoxic packed-bed biological and chemical denitrification reactor system for removing nitrates from influent water according to claim 3, wherein the recycle conduit is connected at, or before, the inlet to the pump means, whereby at least a selected portion of the at least partially de-nitrified water is mixed with the influent water for pumping into the lower chamber.

5. An anoxic packed-bed biological and chemical denitrification reactor system for removing nitrates from influent water according to claim 3, wherein the recycle control valve is located in the recycle conduit for controlling the volumetric recycle flow.

6. An anoxic packed-bed biological and chemical denitrification reactor system for removing nitrates from influent water according to claim 3, wherein the recycle conduit is connected at, or before, the inlet to the pump means, and further including a control valve located in the recycle conduit for controlling the volumetric recycle flow, whereby at least a selected portion of the at least partially de-nitrified water is mixed with the influent water for pumping into the lower chamber.

7. An anoxic packed-bed biological and chemical denitrification reactor system for removing nitrates from influent water according to claim 6 further including a conduit for introducing process water from a source to the feed pump.

8. An anoxic packed-bed biological and chemical denitrification reactor for removing nitrates from influent water according to claim 7 further including a second control valve mounted to control the flow of process water from a source to the feed pump.

9. An anoxic packed-bed biological and chemical denitrification reactor system for removing nitrates from influent water according to claim 1 wherein the height of the vessel is sufficient to provide a media-free volume above the packed bed.

10. An anoxic packed-bed biological and chemical denitrification reactor system for removing nitrates from influent water according to claim 9 wherein the media-free volume above the packed bed occupies about 30% of the volume of the denitrification vessel.

11. An anoxic packed-bed biological and chemical denitrification reactor system for removing nitrates from influent water according to claim 9 wherein the media-free volume above the packed bed is sufficient to accommodate expansion of the packed bed due to up-flow and to contain a quantity of at least partially de-nitrified water that has passed through the packed bed 31 prior to discharge from the reactor.

12. An anoxic packed-bed biological and chemical denitrification reactor system for removing nitrates from influent water according to claim 11 further including a third conduit and a third control valve mounted to control the flow of water discharged from the reactor.

13. An anoxic packed-bed biological and chemical denitrification reactor system for removing nitrates from influent water according to claim 12 further including means for controlling the recycle control valve and the third control valve to control, respectively, the quantity of treated water finally discharged from the reactor as well as the quantity of treated water recycled into the reactor.

14. An anoxic packed-bed biological and chemical denitrification reactor system for removing nitrates from influent water according to claim 13 further including a nitrate sensor for sensing the nitrate concentration in water discharged from the reactor.

15. An anoxic packed-bed biological and chemical denitrification reactor system for removing nitrates from influent water according to claim 13 further including means for controlling the recycle control valve and the third control valve according to the output of the nitrate sensor and, thereby, for controlling the nitrate concentration in water finally discharged from the reactor.

16. An anoxic packed-bed biological and chemical denitrification reactor system for removing nitrates from influent water according to claim 13 further including means for controlling the recycle control valve, and the second and third control valve according to the output of the nitrate sensor for, thereby, controlling the nitrate concentration in water finally discharged from the reactor.

17. An anoxic packed-bed biological and chemical denitrification reactor system for removing nitrates from influent water according to claim 1 wherein the means for providing nutrients into the lower influent-receiving chamber to facilitate the growth of biological substances on the granular media includes a nutrient feed pump connected to transport nutrients into the lower influent-receiving chamber of the reactor.

18. A method for removing nitrates from nitrate-rich influent water, comprising the steps of:
  a) providing a packed-bed biological and chemical denitrification reactor vessel having a closed lower end, an upper end, a distribution plate mounted in the vessel to partition the vessel into a lower influent-receiving chamber and an upper biological and chemical denitrification chamber, the distribution plate having openings formed therein to allow the upflow of water through the plate;
  b) providing a granular media supported by the distribution plate in sufficient quantity to provide a packed bed that has sites for biological growth while leaving a media-free volume above the media to contain a quantity of at least partially de-nitrified water;
  c) providing nutrients into the lower influent-receiving chamber to facilitate the growth of biological substances on the granular media;
  d) sensing the nitrate content of the water in the media-free volume effluent from the upper biological and chemical denitrification chamber;
  e) recycling a selected fraction of the at least partially de-nitrified water from the media-free volume back into the closed lower end of the reactor vessel;
  f) providing nutrients to facilitate the growth of biological substances on the granular media; and
  g) controlling the quantity of recycle flow to maintain anoxic conditions within the packed bed during up-flow of influent water, whereby nitrates are removed from the influent and recycled water.

19. A method for removing nitrates from influent water according to claim 18 further comprising the steps of pumping influent water through the distribution plate in a pattern that allows a generally constant up-flow of water across the interior of the denitrification vessel.

20. A method for removing nitrates from influent water according to claim 19 wherein the pumping of influent water through the distribution plate is accomplished by pumping water containing nitrates into the lower chamber of the reactor.

21. A method for removing nitrates from influent water according to claim 20 wherein the step of recycling a selected fraction of the at least partially de-nitrified water from the media-free volume is accomplished by introducing the recycled fraction at the pumping step so at least a selected portion of the at least partially de-nitrified water is mixed with the influent water pumped into the lower chamber.

22. A method for removing nitrates from influent water according to claim 21 wherein the step of recycling a selected fraction of the at least partially de-nitrified water from the media-free volume is controlled by a recycle control valve located in a recycle conduit for controlling the volumetric recycle flow.

23. A method for removing nitrates from influent water according to claim 22 wherein the flow of process water from a source to the feed pump is controlled by the sensing of the nitrate content of the water in the media-free volume effluent from the upper biological and chemical denitrification chamber.

24. A method for removing nitrates from influent water according to claim 23 including the steps of controlling a recycle control valve and a third control valve to control, respectively, the quantity of treated water finally discharged from the reactor as well as the quantity of treated water recycled into the reactor.

25. An anoxic packed-bed biological and chemical denitrification reactor system for removing nitrates from nitrate-rich influent water comprising:
  a) a denitrification vessel having a closed lower end and a vented upper end;
  b) at least one distribution plate mounted in the vessel to partition the vessel into a lower influent-receiving chamber and an upper biological and chemical denitrification chamber, the distribution plate having openings formed therein to allow the upflow of water through the plate;
  c) at least one aperture in the lower influent-receiving chamber for receiving influent water containing nitrates;
  d) granular media supported by the distribution plate in sufficient quantity to provide a packed bed that has sites for biological growth while leaving a media-free volume above the media to contain a quantity of at least partially de-nitrified water;
  e) a nutrient feed pump connected to transport nutrients into the lower influent-receiving chamber of the reactor to facilitate the growth of biological substances on the granular media;
  f) a recycle conduit to recycle at least a selected portion of the at least partially de-nitrified water into the closed lower end of the vessel;
  g) a nitrate sensor to sense the nitrate content of the effluent from the upper biological and chemical denitrification chamber; and
  h) a recycle valve for controlling the quantity of flow of the at least partially de-nitrified water through the recycle conduit for reentry into the closed lower end of the denitrification vessel, whereby the nitrate sensor and the valve means operated in a cooperative manner to maintain anoxic conditions within the packed bed during up-flow of influent water for removing nitrates from influent and recycled water.

26. An anoxic packed-bed biological and chemical denitrification reactor system for removing perchlorates from water comprising:

a) a vessel having a closed lower end and a vented upper end;

b) at least one distribution plate mounted in the vessel to partition the vessel into a lower influent-receiving chamber and an upper biological and chemical chamber, the distribution plate having openings formed therein to allow the upflow of water through the plate;

c) at least one aperture in the lower influent-receiving chamber for receiving influent water containing nitrates;

d) granular media supported by the distribution plate in sufficient quantity to provide a packed bed that has sites for biological growth while leaving a media-free volume above the media to contain a quantity of at least partially treated water;

e) a nutrient feed pump connected to transport nutrients into the lower influent-receiving chamber of the reactor to facilitate the growth of biological substances on the granular media;

f) a recycle conduit to recycle at least a selected portion of the at least partially treated water into the closed lower end of the vessel; and h) a recycle valve for controlling the quantity of flow of the at least partially treated water through the recycle conduit for reentry into the closed lower end of the vessel, whereby the valve means operated in a cooperative manner to maintain anoxic conditions within the packed bed during up-flow of influent water for removing perchlorate from influent and recycled water.

27. A method for removing perchlorates from water, comprising the steps of:

a) providing a packed-bed biological and chemical reactor vessel having a closed lower end, an upper end, a distribution plate mounted in the vessel to partition the vessel into a lower influent-receiving chamber and an upper biological and chemical chamber, the distribution plate having openings formed therein to allow the upflow of water through the plate;

b) providing a granular media supported by the distribution plate in sufficient quantity to provide a packed bed that has sites for biological growth while leaving a media-free volume above the media to contain a quantity of at least partially treated water;

c) providing nutrients into the lower influent-receiving chamber to facilitate the growth of biological substances on the granular media;

d) recycling a selected fraction of the at least partially treated water from the media-free volume back into the closed lower end of the reactor vessel;

f) providing nutrients to facilitate the growth of biological substances on the granular media; and g) controlling the quantity of recycle flow to maintain anoxic conditions within the packed bed during up-flow of influent water, whereby perchlorate is removed from the influent and recycled water following the removal of nitrates.

* * * * *